(12) United States Patent
Brogly et al.

(10) Patent No.: US 6,868,930 B2
(45) Date of Patent: Mar. 22, 2005

(54) AUTOMOBILE VEHICLE INCLUDING ASSOCIATED BODY PARTS WITH REDUCED CLEARANCE

(75) Inventors: Sébastien Brogly, St Just (FR); Ghislain George, Bernon (FR)

(73) Assignee: Peguform France, Saint Marcel (FR)

(*) Notice: Subject to any disclaimer, the term of this patent is extended or adjusted under 35 U.S.C. 154(b) by 0 days.

(21) Appl. No.: 09/952,727

(22) Filed: Sep. 13, 2001

(65) Prior Publication Data

US 2002/0033286 A1 Mar. 21, 2002

(30) Foreign Application Priority Data

Sep. 13, 2000 (FR) .............................................. 00 11678

(51) Int. Cl.[7] .............................................. B62D 25/10
(52) U.S. Cl. ................................... 180/69.21; 180/69.2
(58) Field of Search .......................... 180/69.2, 69.21, 180/69.22, 69.23, 69.24, 89.13, 89.1, 89.17; 296/146.12, 100.08, 76; 292/DIG. 14, 216, 201, 207

(56) References Cited

U.S. PATENT DOCUMENTS

| 2,215,606 | A | | 9/1940 | Dunn |
|---|---|---|---|---|
| 2,548,492 | A | * | 4/1951 | Rivard et al. ............. 180/69.21 |
| 3,633,390 | A | | 1/1972 | Wartian |
| 3,754,614 | A | * | 8/1973 | Habas .................... 180/69.21 |
| 3,767,001 | A | | 10/1973 | Chupick |
| 3,893,207 | A | | 7/1975 | Rudaitis |
| 4,012,807 | A | | 3/1977 | Kern |
| 4,186,476 | A | * | 2/1980 | Mair et al. .............. 180/69.21 |
| 4,206,944 | A | | 6/1980 | Kumagai et al. |
| 4,458,774 | A | | 7/1984 | Sieren |
| 4,753,475 | A | | 6/1988 | Mochida |
| 4,839,941 | A | | 6/1989 | Orlando |
| 5,004,062 | A | | 4/1991 | Foot |
| 5,101,921 | A | | 4/1992 | West et al. |
| 5,136,752 | A | | 8/1992 | Bening et al. |
| 5,197,560 | A | | 3/1993 | Oda et al. |
| 5,385,212 | A | | 1/1995 | Cady et al. |
| 5,482,348 | A | * | 1/1996 | Mass et al. .............. 180/69.21 |
| 5,682,667 | A | * | 11/1997 | Flagg ....................... 180/69.2 |
| 6,109,670 | A | * | 8/2000 | Tomaszewski et al. ..... 292/216 |
| 6,257,657 | B1 | | 7/2001 | Sasaki |
| 6,311,796 | B1 | | 11/2001 | Mayer |
| 6,394,211 | B1 | * | 5/2002 | Palenchar et al. ....... 180/69.21 |

FOREIGN PATENT DOCUMENTS

| DE | 42 26 437 A1 | 2/1993 | |
|---|---|---|---|
| DE | 4240 790 C1 | 2/1994 | |
| DE | 198 46 644 A1 | 4/2000 | |
| FR | 2 407 114 | 10/1978 | |
| FR | 2664555 A1 | * 1/1992 | ......... B62D/25/12 |
| JP | 358311974 A | 12/1983 | |

* cited by examiner

Primary Examiner—Hau Phan
(74) Attorney, Agent, or Firm—Brooks Kushman P.C.

(57) ABSTRACT

A vehicle includes a chassis, a hood mobile relative to the chassis and at least one body component. Contact of the body component with the hood determines a position of the body component relative to the hood.

19 Claims, 7 Drawing Sheets

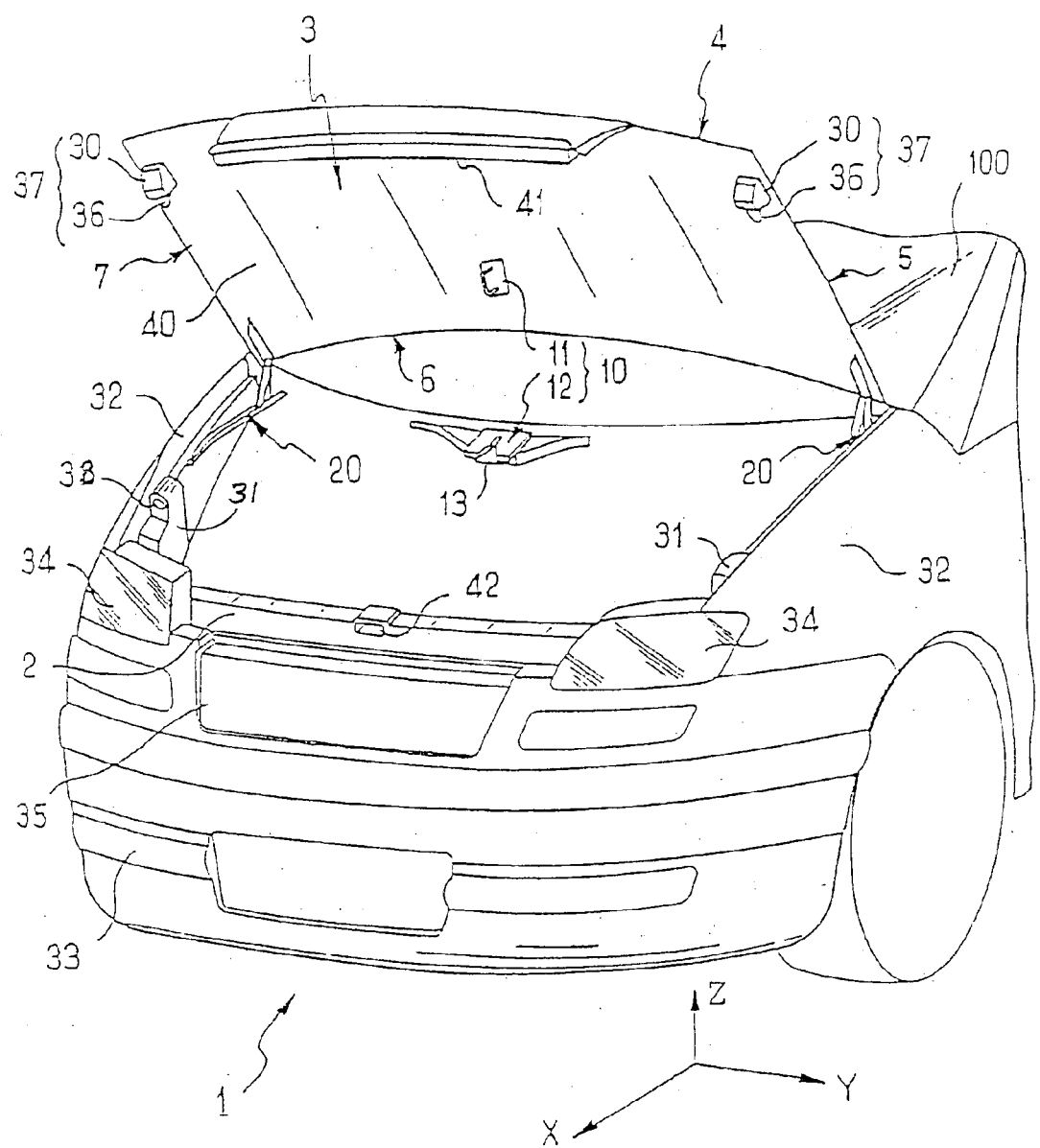
FIG_1

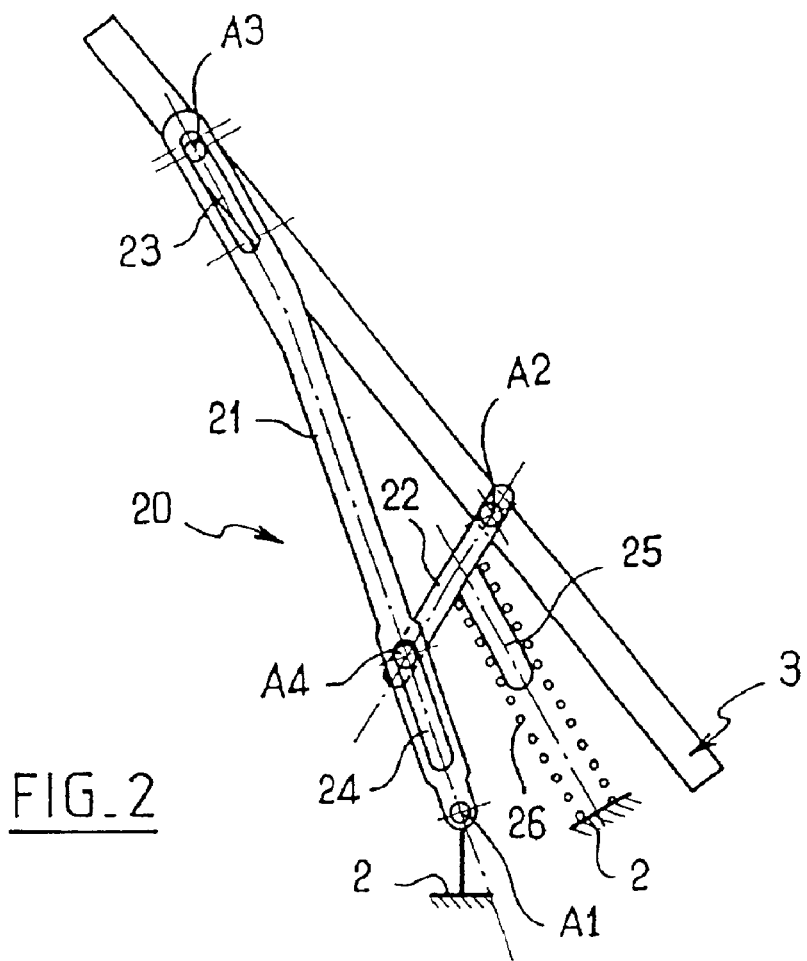
FIG_2
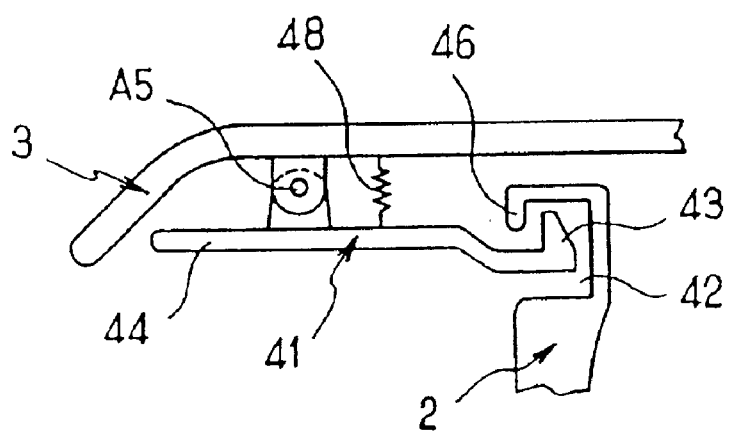
FIG_4

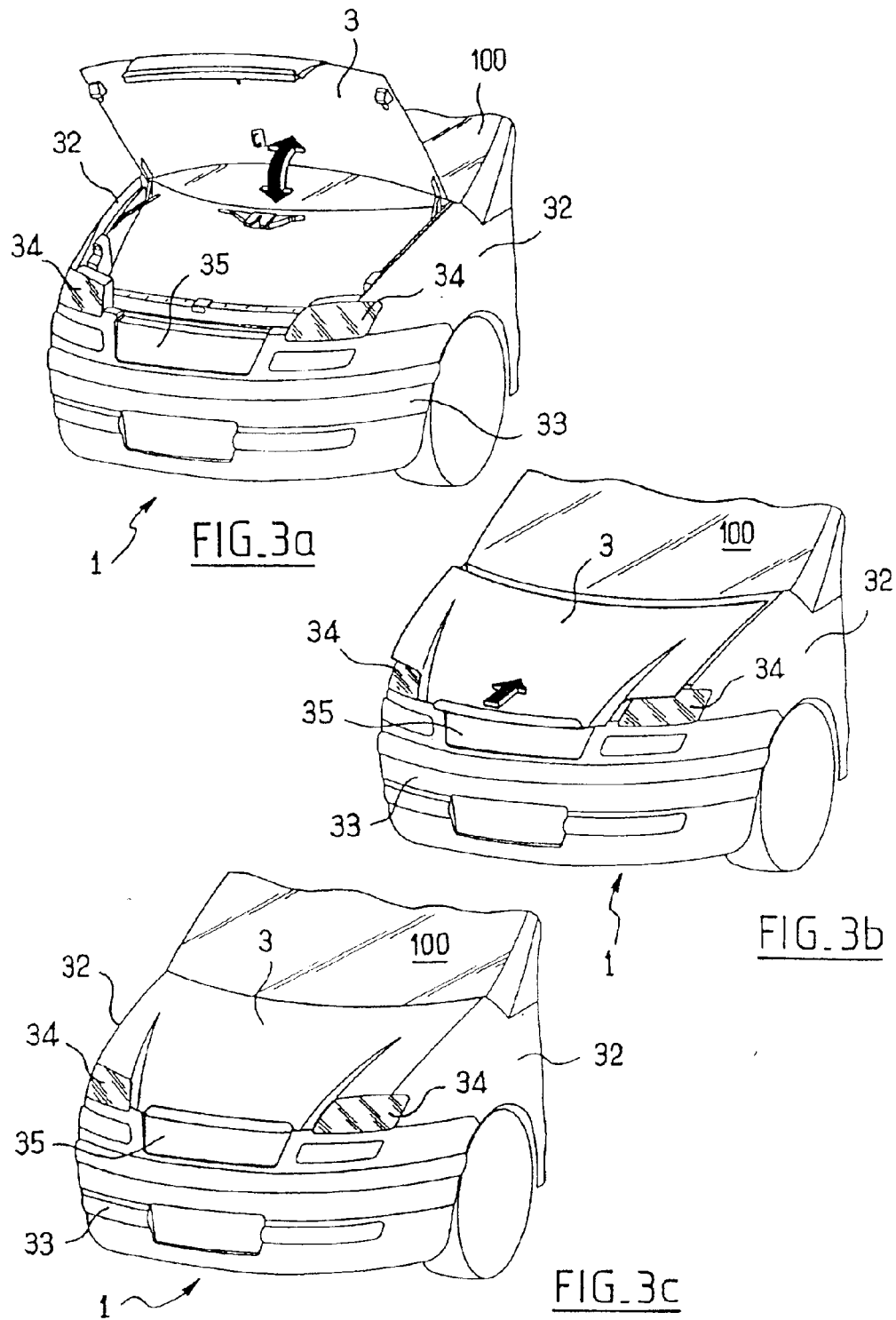

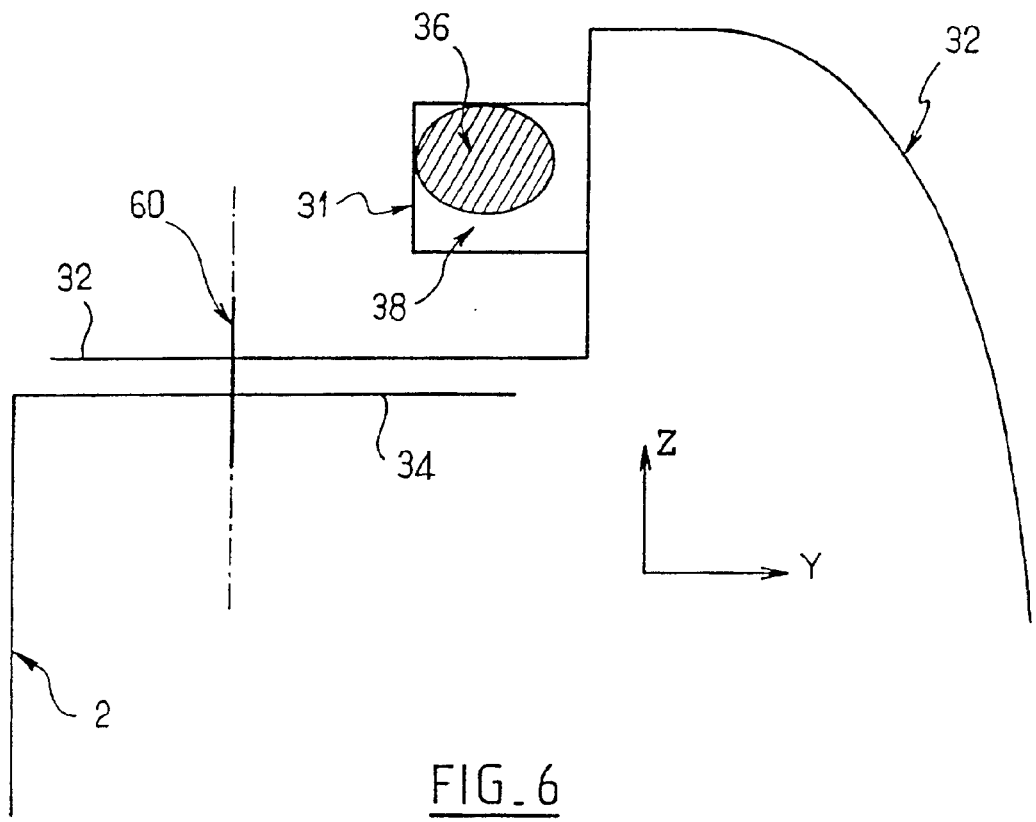
FIG_6
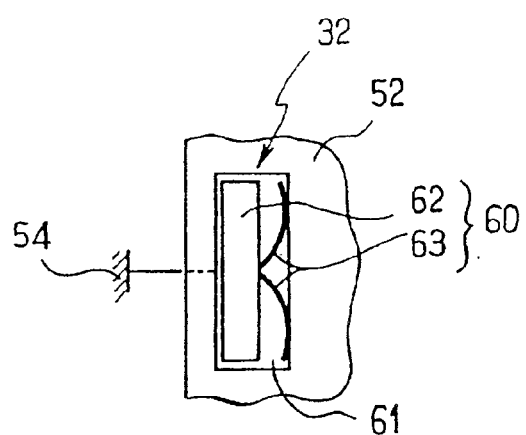
FIG_10

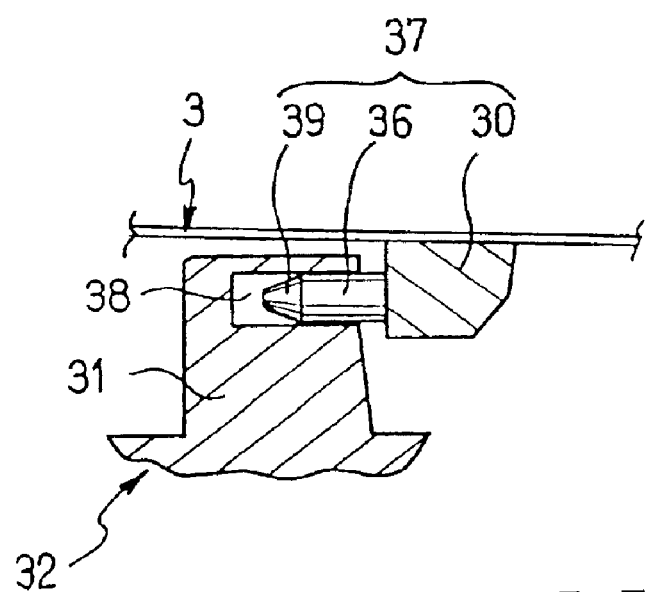
FIG_7
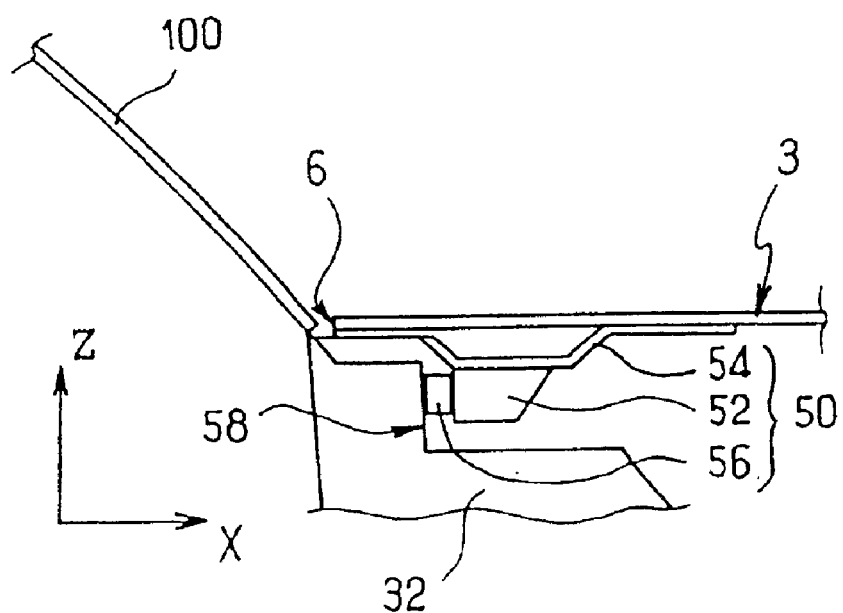
FIG_8

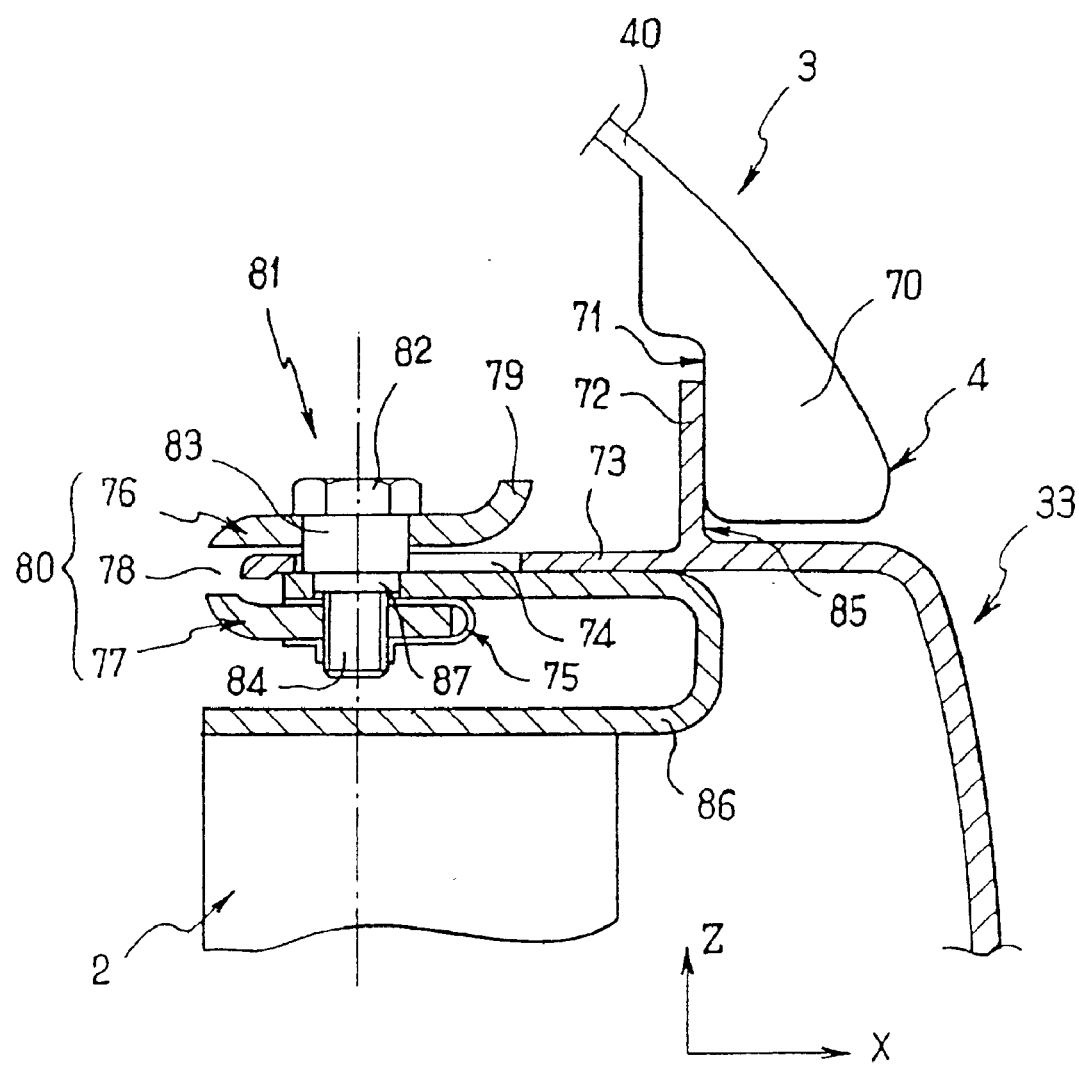
FIG_9

AUTOMOBILE VEHICLE INCLUDING ASSOCIATED BODY PARTS WITH REDUCED CLEARANCE

This application is related to U.S. Ser. No. 09/952,417, filed Sep. 13, 2001, now issued as U.S. Pat. No. 6,588,525.

BACKGROUND OF THE INVENTION

1. Field of the Invention

The invention relates to systems for assembling vehicle body components.

2. Description of the Prior Art

There exist vehicles with body components fixed independently to the structure of the vehicle, such as wings, bumpers and a radiator grille. The hood, another body component, pivots relative to the structure of the vehicle on hinges at the rear of the hood, i.e. at the end adjoining the windshield frame. Each component is referenced relative to the chassis. It follows that the string of dimensions for positioning the various body components relative to each other passes through the structure of the vehicle. The string of dimensions of this type of component assembly therefore makes large clearances obligatory. This can cause imperfect relative positioning of the components and lead to less than graceful alignments and flush relationships, compromising the esthetics of the vehicle.

An object of the present invention is to minimize these positioning clearances.

SUMMARY OF THE INVENTION

To achieve the above object, the present invention provides a vehicle including a chassis, a hood mobile relative to the chassis and at least one body component, in which vehicle contact of the body component with the hood determines a position of the body component relative to the hood.

Thus the body component and the hood are referenced directly relative to each other. The string of dimensions for positioning the two components relative to each other no longer passes through the structure of the vehicle. This reduces the positioning clearances and thereby improves the esthetics of the vehicle.

The hood is advantageously adapted to co-operate with the body component during movement of the hood to determine the position of the body component.

The body component is advantageously mounted on the chassis by means of a non-rigid connection.

The position of the body component advantageously corresponds to a closed position of the hood.

The vehicle advantageously includes at least one centering bracket adapted to provide the contact.

The centering bracket is advantageously adapted to co-operate with an orifice in a boss.

The centering bracket advantageously projects from a bottom face of the hood and the boss advantageously projects from the body component.

The vehicle advantageously includes an abutment adapted to provide the contact.

The abutment advantageously projects from a bottom face of the hood.

The abutment is advantageously at a front edge of the hood.

The body component is advantageously a wing of the vehicle.

The body component is advantageously a bumper of the vehicle.

The hood is advantageously mobile relative to the chassis with a movement that includes at least one movement in translation.

The hood is advantageously mobile relative to the chassis with a movement that includes rotation and movement in translation.

The boss advantageously projects from a bottom face of the hood and the centering bracket advantageously projects from the body component.

Other features and advantages of the invention will become apparent in the course of the following description of one preferred embodiment of the present invention, which is given by way of non-limiting example.

BRIEF DESCRIPTION OF THE DRAWINGS

FIG. 1 is a partial three-dimensional view of the front of a preferred embodiment of a vehicle in accordance with the invention.

FIG. 2 is a profile view showing how the hood of the vehicle shown in FIG. 1 is connected to the chassis.

FIGS. 3a, b and c are partial three-dimensional views of the front of the vehicle shown in FIG. 1 and show the steps of closing the hood.

FIG. 4 is a diagrammatic view of a safety catch for the hood of the vehicle shown in FIG. 1.

FIG. 6 is a diagrammatic view in section taken along the line VI—VI in FIG. 5 of the assembly of one wing of the vehicle shown in FIG. 5 when the hood is closed.

FIG. 7 is a diagrammatic view in section taken along the line VII—VII in FIG. 5 of the same assembly when the hood is closed.

FIG. 8 is a diagrammatic view in section taken along the line VIII—VIII in FIG. 5 of the same assembly when the hood is closed.

FIG. 9 is a view in section taken along the line IX—IX in FIG. 5 of the assembly of the bumper of the vehicle when the hood is closed.

FIG. 10 is a partial bottom view of the connecting means between the wing and the chassis.

DETAILED DESCRIPTION OF THE PREFERRED EMBODIMENT

Figure 5:
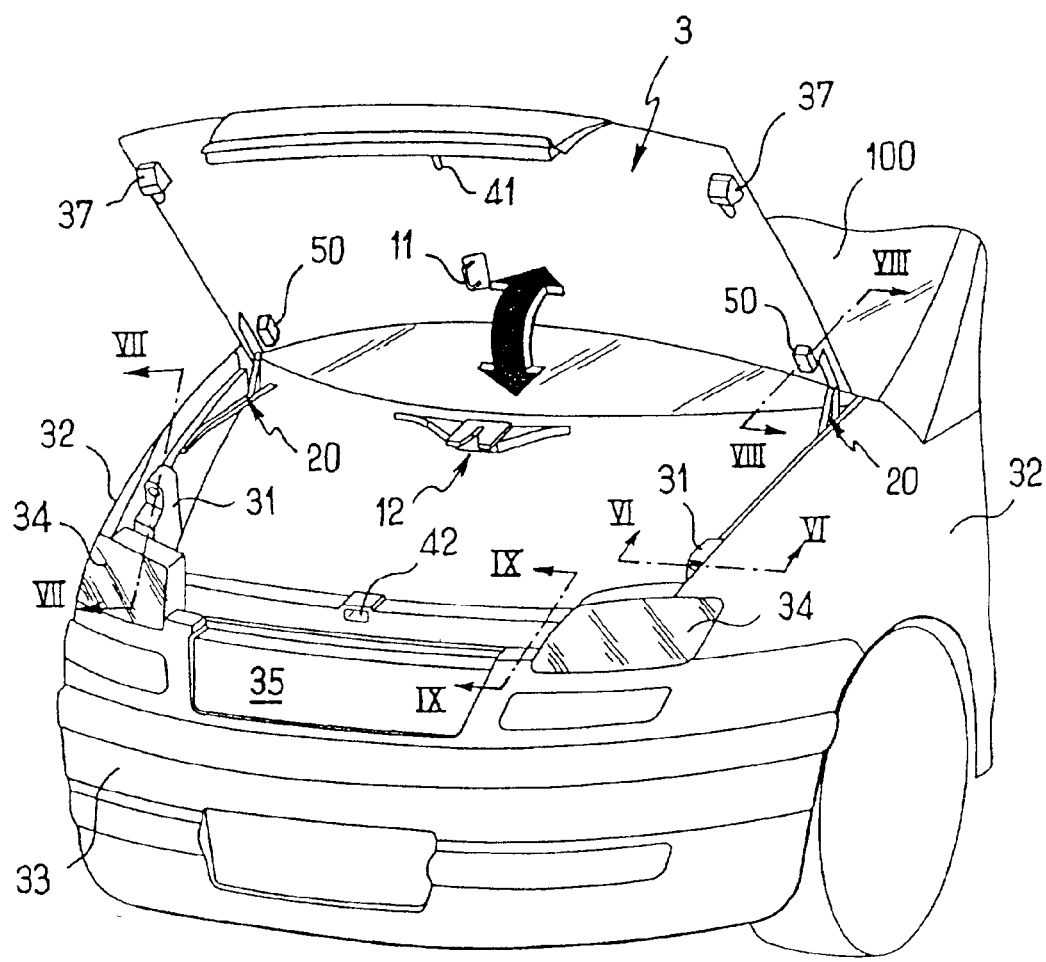
FIG. 5 is a partial three-dimensional view of the front of the vehicle shown in FIG. 1 with an additional option.

Throughout the following description, the axes X, Y and Z are as shown in FIG. 1: the axis X is horizontal and in the direction of movement of the vehicle, the axis Y is horizontal and perpendicular to the axis X, and the axis Z is directed upward and perpendicular to the axes X and Y. The axes therefore form a direct frame of reference.

Referring to FIG. 1, the front body 1 of a vehicle in accordance with the present invention includes a scuttle 33, a grille 35, two wings 32, two light units 34 at the front ends of the wings 32 and on respective opposite sides of the grille 35, and a hood 3, the bodyshell as a whole covering a chassis, of which only a portion 2 is shown.

The hood 3 includes a wall 40 delimited by a more or less convex front edge 4, a more or less straight right-hand edge 5, a more or less concave rear edge 6 and a more or less straight left-hand edge 7.

The hood 3 includes connecting devices 20 which connect it to the chassis of the vehicle and enable it to move relative thereto. They are respective connecting devices 20 near the right-hand and left-hand edges 5, 7 of the wall 40, near the rear edge 6. Note that FIG. 1 does not show the connecting devices 20 mounted on the hood 3 completely, but that FIG. 2 does.

Referring to FIG. 2, each of the connecting devices 20 includes two arms 21 and 22. The arm 21 can rotate on the chassis of the vehicle about a horizontal pin A1 perpendicular to the direction of motion of the vehicle. A rear portion of the arm 21 includes a slot 24 in which a pin A4 parallel to the pin A1 can slide. The arm 21 has a second part that extends the first part toward the front at an angle α. The second part includes a slot 23 in which a pin A3 attached to the hood 3 and parallel to the pins A1 and A4 slides. The arm 22 is fastened at one end to the pin A4. At its other end it has a second pin A2 which is parallel to the pins A1, A3 and A4 and connects the arm 22 to the hood 3 by an arrangement that can rotate about the pin A2. The arm 22 further includes a support 25 projecting toward the rear on the same side as the pin A1 when the arm 22 is mounted in the connecting device 20. The support 25 is fastened to the arm 22 and receives a spring 26 whose rear end is fastened to the chassis of the vehicle and whose front end bears on the arm 22. In this example the spring 26 is a coil spring. In a different embodiment, not shown, the support 25 can rotate relative to the arm 22 about an axis parallel to one of the pins A2, A4.

Referring again to FIG. 1, the vehicle has a locking member 10 near the rear edge 6. The locking member includes a lock 12 which can be connected to a portion of the chassis of the vehicle that is not shown and includes a receiving notch 13 that is flared at its front end and blind at its rear end. The locking member 10 further includes a loop 11 projecting from the inside face of the wall 40 of the hood 3 and connected to that wall 40. The loop 11 is received in the notch 13 of the lock 12 when the hood 3 is closed, so locking it in its closed position. As in the prior art, the locking member 10 further includes a cable, not shown, which can be operated from the passenger compartment of the vehicle to unlock the hood 3 when it is locked in its closed position: the cable releases the loop 11 from the lock 12 so that the hood can be opened.

The hood 3 includes a symmetrical pair of brackets 37 near the front edge 4, with one on each lateral side of the wall 40, near the right-hand and left-hand edges 5 and 7, respectively; the respective body 30 of each bracket projects from the lower face of the wall 40. A circular section stud 36 projects from the body 30 parallel to the wall 40 of the hood 3 and toward the rear edge 6. The studs 36 are adapted to engage in orifices 38 formed in the front faces of respective bosses 31 projecting from respective inner wings 32.

Referring to FIGS. 6 and 7, showing the aforementioned cooperation, the stud 36 has a conical end 39 to facilitate inserting it into the orifice 38 when it is engaged therein. Engaging the stud 36 in the orifice 38 in this way determines the position of the wing 32 relative to the hood 3 along the axis Z. This optimizes the flush relationship of the two body components. Similarly, engaging the stud 36 in the orifice 38 controls the position of the two components relative to each other along the axis Y. This also minimizes the clearance between the wing 32 and the hood 3.

The wing 32 is connected to the chassis 2 by connecting means 60 shown diagrammatically in FIG. 6 by their main axis and one embodiment of which is shown in FIG. 10. The wing 32 has an extension 52 which here is adapted to cover the edge 54 of the chassis 2. An orifice 61 through the extension 52 at the location of the connecting means 60, not shown in FIG. 6, is of rectangular shape, for example, and constitutes an opening adapted to receive the connecting means 60. The latter are fastened to the rim 54 of the chassis 2 and leave the wing 32 free to move in translation in the directions of the axes Y and Z relative to the rim 54 within the limits of the orifice 61. The orifice 61 has a quasi-rectangular section, as shown in FIG. 10. The connecting means 60 include a stud 62 fastened to the rim 54 of the chassis 2 and projecting from the top face of the rim 54. The connecting means 60 also include at least one leaf spring 63 fastened to the stud 62 on the side of the stud 62 facing towards the wing 2. The stud 62 is adapted to be received into the orifice 61 and the leaf springs 63 are adapted to bear against the edge of the orifice 61 facing the side of the aforementioned stud 62. The main function of the leaf springs is to urge the wing 32 outward on opening the hood 3, once the brackets 37 have been disengaged from the orifices 38.

Referring to FIG. 4, the vehicle includes a safety catch comprising a latch 41, and a housing 42. The safety catch includes the housing 42 formed in the front portion 2 of the chassis of the vehicle, above the grille 35. The opening of the housing 42 is partly closed at the top by a tongue 46. The safety catch further includes the latch 41 having at the rear a hook 43 that is received freely in the housing 42 via its opening and at the front a manipulator arm 44. The latch 41 is mounted on the hood 3 so that it can rotate about a horizontal pin A5 perpendicular to the direction of movement of the vehicle and extending between the arm 44 and the hook 43. A return spring 48 connects the latch 41 and the hood 3 so that the hook 43, when it is not manipulated in any way, is held as close as possible to the wall of the hood.

Referring to FIGS. 5 and 8, the hood 3 has a pair of abutments 50 extending laterally and symmetrically on respective opposite sides of the wall 40 in the vicinity of the rear edge 6 and respectively in the vicinity of the right-hand edge 5 and the left-hand edge 7. Their respective body 52 projects from a respective boss 54 on the bottom face of the wall 40. A circular section buffer 56 projects from the body 52 toward the rear edge 6 in the direction parallel to the wall 40 of the hood 3. The rear face of the buffer 56 is adapted to come into contact with a face 58 formed in the wing 32. The face 58 is directed toward the front of the vehicle, in the same direction as the axis X, and parallel to the rear face of the buffer 56. The abutment 50 positions the hood along the axis X on completion of a movement in translation described later in order to reduce alignment differences in that direction between the hood 3 and the wings 32 of the vehicle.

Referring to FIG. 9, the wall 40 of the hood 3 has a flared front edge 4 forming a reinforcement 70. The reinforcement 70 has a rear face 71 which is vertical and directed toward the rear in the opposite direction to the axis X when the hood 3 is closed. The bumper 33 has an edge 73 extending it horizontally toward the rear at its rear end. The bumper 33 further includes an excrescence 72 forming a vertical wall projecting from the top face of the edge 73. The wall 72 has a vertical front face 85 directed toward the front in the direction of the axis X. The face 8S is adapted to come into surface contact with the face 71 of the hood 3. The face 71 then acts as an abutment which, when the hood is closed, defines the relative positions of the bumper 33 and the hood 3 so that the two components are aligned optimally along the axis X.

The edge 73 includes an orifice 74 which passes completely through it and has an oblong section with its greater length in the direction of the axis X. The chassis 2 further includes at the top of its front technical bulkhead an inverted U-shaped rim 86 whose top branch is directed horizontally toward the rear in the direction opposite the axis X. This top branch is adapted to cooperate with the edge 73 of the bumper 33 which, here, is adapted to cover it. The connecting means connect the bumper 33 to the chassis 2. The connecting means include a presser member 80 and a bolt 81. The presser member 80 has two separate branches 76, 77 with a gap 78 between them. The bottom branch 77 includes a nut 75. The top branch 76 has an orifice adapted to receive a portion 83 of the bolt 81 and terminates in a lever 79. The two branches 76 and 77 are adapted to sandwich between them the edge 73 of the bumper 33 and the top branch of the rim 86 of the chassis 2. The assembly is retained by a bolt 81 which has a hexagonal head 82, followed by a circular section first part 83 having a first diameter corresponding to the diameter of the circular orifice in the top branch 76 of the presser member 80 and to the width of the opening 74 in the edge 73, followed by a circular section second part 87 having a second diameter smaller than the first diameter and corresponding to the circular orifice of the top branch of the rim 86. Finally, the bolt 81 has a third part 84 with a thread adapted to co-operate with that of the nut 75 fastened to the bottom branch 77 of the presser member 80. The height of the first part 83 of the bolt 81 is slightly greater than the combined thicknesses of the edge 73 and the top branch of the rim 86. Thus the bumper 33 is able to move in translation along the axis X relative to the chassis 2. In the event of an impact, the gap 78 between the two branches 76 and 77 of the presser member 80 enables sufficient unimpeded depression of the bumper 33 for the front technical bulkhead not to be damaged.

How the above components work is explained next.

Referring to FIGS. 3a to 3c, assume that the hood 3 is raised to its open position, as shown in FIG. 3a. The pins A3 and A4 are at the end farthest from the pin A1 of the respective slots 23 and 24 because of the thrust that the spring 26 applies to its support 25, which is connected to the arm 22. The connecting devices 20 are therefore as shown in FIG. 2.

Closure of the hood begins with a downward rotation about the pin A1 of the connecting devices 20, which rotation continues until the hood 3 reaches the position shown in FIG. 3b. The pins A3 and A4 then remain in the same position within their respective slots, because of the thrust of the spring 26. Also, the loop 11 is then in front of the notch 13 of the lock 12. Similarly, the hook 43 of the latch 41 is in front of the opening of the housing 42 but disengaged from it.

Closure then continues through movement of the hood in translation in a direction slightly above the horizontal and toward the rear of the vehicle. The pins A3 and A4 slide in their respective slots 23, 24 towards their rear end. The movement in translation:

- compresses the springs 26;
- engages the hook 43 of the latch 41 freely in the housing 42, the spring 48 ensuring that the hook 43 is raised well behind the tongue 46;
- engages the loop 11 in the notch 13 of the lock 12, up to the point at which locking of the lock 12 is triggered;
- engages each of the studs 36 in the opening of the respective boss 31 in the respective wing 32 and defines the position of the wings relative to the hood along the axes Y and Z;
- abuts the buffers 56 against the face 58 and determines the position of the wings relative to the hood along the axis X;

abuts the face 71 of the hood 3 against the front face 85 of the bumper 33 and determines the position of the bumper relative to the hood along the axis X.

The hood 3 is therefore locked in a closed position, as shown in FIG. 3c.

Now assume that the hood is in its locked closed position, as shown in FIG. 3c. Operating the unlocking cable overrides the lock 12, releasing the loop 11. Because of the thrust of the springs 26, the hood begins to move in translation in a direction slightly below the horizontal and toward the front of the vehicle, and the hook 43 then abuts against the tongue 46. Action on the arm 44 of the latch 41 then releases the hook 43 by disengaging it from the housing 42. The movement of the hood in translation continues because of the thrust of the spring 26. The loop 11 disengages from the notch 13 of the lock 12 and the studs 36 disengage from the openings in the bosses 31. The movement in translation is interrupted when the pins A3 and A4 abut against the front ends of the respective slots 23, 24. FIG. 3b shows the position of the hood at this moment. Then, upward movement in rotation about the pin A1 raises the hood to its open position.

Of course, many modifications can be made to the present invention without departing from the scope of the invention.

In particular, the connecting devices can be hinges so that the hood is mounted on the chassis to rotate about only one axis.

The return spring of the safety catch can be a tension spring or a torsion spring mounted on the pin.

The latch can be fastened to the hood at the end opposite the hook, the body of the latch serving as a return spring.

The brackets 37 can project from the inside face of the wings 32 and the bosses 31 from the bottom face of the wall 40.

The spring 63 can be a single leaf spring.

The connecting means 60 can be presser members 80.

The hood can determine the position of either the bumper alone or a wing alone. It can also determine the position of some other single component.

What is claimed is:

1. A vehicle including a chassis (2), a hood (3) movable relative to said chassis, at least one body component (32, 33) having a position that is adjustable relative to said hood, whereby engagement of said body component with said hood determines the position of said body component relative to said hood, connecting devices (20) that connect the hood to the chassis at right-hand and left-hand edges of the hood, said connecting devices including a first arm (21) rotatable on the chassis about a first horizontal pin (A1) perpendicular to the direction of motion of the vehicle when the hood translates between opened and closed positions, said first arm having a first part comprising a rear portion including a slot (24) in which a second horizontal pin (A4) slides, and a second part including a slot (23) in which a third horizontal pin (A3) that is attached to the hood slides, and a second arm (22) fastened at a first end to the first horizontal pin, and having a second end having a fourth horizontal pin (A2) fastened therein, wherein the fourth horizontal pin connects the second arm to the hood, and the second arm rotates about the fourth horizontal pin, the second arm further including a support (25) projecting toward the rear and on the same side of the second arm as the first horizontal pin when the second arm is mounted in the connecting device, wherein the support is fastened to the second arm and receives a spring (26) having a rear end that is fastened to the chassis and having a front end that bears on the second arm and generates a thrust towards the front of the vehicle when the hood is unlocked, and a pair of symmetrical brackets (37) at a front edge (4) and on right-hand edge (5) and left-hand edge (7), respectively, of the hood, each of the symmetrical brackets having a body (30) projecting from a lower face (40) of the hood, and a circular section stud (36) projecting from the body parallel to the face of the hood and toward the rear of the vehicle, and respective bosses (31) projecting from inner surfaces of respective wings (32), wherein the studs have conical ends that are adapted to engage in orifices (38) formed in front faces of the bosses when the hood translates in a rearward horizontal movement, whereby engaging the studs in the orifices determines the position of the wing relative to the hood along Y and Z axes.

2. The vehicle claimed in claim 1 wherein said hood is adapted to co-operate with said body component during movement of said hood to determine the position of said body component.

3. The vehicle claimed in claim 1 wherein said body component is mounted on said chassis by means of a non-rigid connection comprising said connecting devices.

4. The vehicle claimed in claim 1 wherein the position of said body component corresponds to a closed position of said hood.

5. The vehicle claimed in claim 1 including at least abutment (50) adapted to further provide said position.

6. The vehicle claimed in claim 5 wherein said abutment is adapted to co-operate with a respective boss (54).

7. The vehicle claimed in claim 5 wherein said at least one abutment projects from a bottom face of said hood and extends laterally and symmetrically on opposite sides of the lower face of the hood.

8. The vehicle claimed in claim 7 including an buffer (56) adapted to further provide said engagement.

9. The vehicle claimed in claim 8 wherein said abutment projects from a boss (54) on the lower face of said hood.

10. The vehicle claimed in claim 8 wherein said abutment is at a rear edge of said hood.

11. The vehicle claimed in claim 1 wherein said body component is a wing of said vehicle.

12. The vehicle claimed in claim 1 wherein said body component is a bumper of said vehicle.

13. The vehicle claimed in claim 1 wherein said hood is movable relative to said chassis with a movement that includes at least one movement in translation.

14. The vehicle claimed in claim 1 wherein said hood is movable relative to said chassis with a movement that includes rotation and movement in translation.

15. A vehicle including a chassis (2), a hood (3) movable relative to said chassis, at least one body component (32, 33) having a position that is adjustable relative to said hood, whereby engagement of said body component with said hood determines the position of said body component relative to said hood, wherein said hood is adapted to co-operate with said body component during movement of said hood to determine the position of said body component, and a pair of symmetrical brackets (37) at a front edge (4) and on right-hand edge (5) and left-hand edge (7), respectively, of the hood, each of the symmetrical brackets having a body (30) projecting from a lower face (40) of the hood, and a circular section stud (36) projecting from the body parallel to the face of the hood and toward the rear of the vehicle, and respective bosses (31) projecting from inner surfaces of respective wings (32), wherein the studs have conical ends that are adapted to engage in orifices (38) formed in front faces of the bosses when the hood translates in a rearward horizontal movement, whereby engaging the studs in the orifices determines the position of the wing relative to the hood along Y and Z axes.

16. A vehicle including a chassis (2), a hood (3) movable relative to said chassis, at least one body component (32, 33) having a position that is adjustable relative to said hood, whereby engagement of said body component with said hood determines the position of said body component relative to said hood, wherein said body component is mounted on said chassis by means of a non-rigid connection, and a pair of symmetrical brackets (37) at a front edge (4) and on right-hand edge (5) and left-hand edge (7), respectively, of the hood, each of the symmetrical brackets having a body (30) projecting from a lower face (40) of the hood, and a circular section stud (36) projecting from the body parallel to the face of the hood and toward the rear of the vehicle, and respective bosses (31) projecting from inner surfaces of respective wines (32), wherein the studs have conical ends that are adapted to engage in orifices (38) formed in front faces of the bosses when the hood translates in a rearward horizontal movement, whereby engaging the studs in the orifices determines the position of the wing relative to the hood along Y and Z axes.

17. A vehicle including a chassis (2), a hood (3) movable relative to said chassis, at least one body component (32, 33) having a position that is adjustable relative to said hood, whereby engagement of said body component with said hood determines the position of said body component relative to said hood, wherein said hood is movable relative to said chassis with a movement that includes at least one movement in translation, and connecting devices (20) that connect the hood to the chassis at right-hand and left-hand edges of the hood, said connecting devices including a first arm (21) rotatable on the chassis about a first horizontal pin (A1) perpendicular to the direction of motion of the vehicle when the hood translates between opened and closed positions, said first arm having a first part comprising a rear portion including a slot (24) in which a second horizontal pin (A4) slides, and a second part including a slot (23) in which a third horizontal pin (A3) that is attached to the hood slides, and a second arm (22) fastened at a first end to the first horizontal pin, and having a second end having a fourth horizontal pin (A2) fastened therein, wherein the fourth horizontal pin connects the second arm to the hood, and the second arm rotates about the fourth horizontal pin, the second arm further including a support (25) projecting toward the rear and on the same side of the second arm as the first horizontal pin when the second arm is mounted in the connecting device, wherein the support is fastened to the second arm and receives a spring (26) having a rear end that is fastened to the chassis and having a front end that bears on the second arm and generates a thrust towards the front of the vehicle when the hood is unlocked.

18. A vehicle including a chassis (2), a hood (3) movable relative to said chassis, at least one body component (32, 33) having a position that is adjustable relative to said hood, whereby engagement of said body component with said hood determines the position of said body component relative to said hood, wherein said hood is movable relative to said chassis with a movement that includes rotation and movement in translation, and connecting devices (20) that connect the hood to the chassis at right-hand and left-hand edges of the hood, said connecting devices including a first arm (21) rotatable on the chassis about a first horizontal pin (A1) perpendicular to the direction of motion of the vehicle when the hood translates between opened and closed positions, said first arm having a first part comprising a rear portion including a slot (24) in which a second horizontal pin (A4) slides, and a second part including a slot (23) in which a third horizontal pin (A3) that is attached to the hood slides, and a second arm (22) fastened at a first end to the first horizontal pin, and having a second end having a fourth horizontal pin (A2) fastened therein, wherein the fourth horizontal pin connects the second arm to the hood, and the second arm rotates about the fourth horizontal pin, the second arm further including a support (25) projecting toward the rear and on the same side of the second arm as the first horizontal pin when the second arm is mounted in the connecting device, wherein the support is fastened to the second arm and receives a spring (26) having a rear end that is fastened to the chassis and having a front end that bears on the second arm and generates a thrust towards the front of the vehicle when the hood is unlocked.

19. The vehicle claimed in claim 18 wherein said second part of the first arm extends the first part of the first arm toward the front of the vehicle at an angle ($\alpha$).

* * * * *